US008703661B2

(12) United States Patent
Oboodi et al.

(10) Patent No.: US 8,703,661 B2
(45) Date of Patent: Apr. 22, 2014

(54) COMPONENTS, TURBOCHARGERS, AND METHODS OF FORMING THE COMPONENTS

(75) Inventors: Reza Oboodi, Morris Plains, NJ (US); James Piascik, Randolph, NJ (US); Bjoern Schenk, Commungny (CH)

(73) Assignee: Honeywell International Inc., Morristown, NJ (US)

( * ) Notice: Subject to any disclaimer, the term of this patent is extended or adjusted under 35 U.S.C. 154(b) by 10 days.

(21) Appl. No.: 13/369,853

(22) Filed: Feb. 9, 2012

(65) Prior Publication Data

US 2012/0141290 A1 Jun. 7, 2012

Related U.S. Application Data

(62) Division of application No. 12/182,857, filed on Jul. 30, 2008, now Pat. No. 8,137,747.

(51) Int. Cl.
 *F16C 33/04* (2006.01)
(52) U.S. Cl.
 USPC ........... 508/108; 508/100; 508/103; 184/100; 184/104.2
(58) Field of Classification Search
 USPC .................. 427/29, 216, 282; 451/41, 56, 57; 508/101, 103, 104, 106, 110, 113; 184/5, 109
 See application file for complete search history.

(56) References Cited

U.S. PATENT DOCUMENTS

| | | | |
|---|---|---|---|
| 3,677,612 A | 7/1972 | Barnett et al. | |
| 3,990,860 A | 11/1976 | Flethcer et al. | |
| 4,557,974 A | 12/1985 | Tsukuda et al. | |
| 4,699,523 A * | 10/1987 | Hagemeister | 384/103 |
| 4,995,995 A * | 2/1991 | Garvey et al. | 508/143 |
| 5,039,311 A | 8/1991 | Bloecher | |
| 5,089,154 A | 2/1992 | King | |
| 5,175,929 A | 1/1993 | Anthony et al. | |
| 5,223,213 A | 6/1993 | Kamimura et al. | |
| 5,358,753 A | 10/1994 | Rao et al. | |
| 5,385,789 A | 1/1995 | Rangaswamy et al. | |
| 5,474,583 A | 12/1995 | Celikkaya | |
| 5,482,637 A | 1/1996 | Rao et al. | |
| 5,484,662 A | 1/1996 | Rao | |
| 5,702,769 A | 12/1997 | Peters | |
| 6,372,345 B1 | 4/2002 | Wakae et al. | |
| 6,372,346 B1 | 4/2002 | Toth | |
| 6,475,254 B1 | 11/2002 | Saak et al. | |
| 6,613,383 B1 | 9/2003 | George et al. | |
| 6,824,872 B2 | 11/2004 | Coates et al. | |
| 7,067,203 B2 | 6/2006 | Joelsson et al. | |
| 2005/0163406 A1 | 7/2005 | Oboodi et al. | |
| 2005/0163407 A1* | 7/2005 | Kang et al. | 384/106 |
| 2005/0262965 A1 | 12/2005 | Palanisamy et al. | |
| 2006/0086090 A1 | 4/2006 | Kilkenny | |
| 2006/0088435 A1 | 4/2006 | Gupta et al. | |
| 2007/0021255 A1 | 1/2007 | Ito | |
| 2009/0155479 A1* | 6/2009 | Xiao et al. | 427/451 |
| 2010/0004147 A1* | 1/2010 | Mizrahi | 508/103 |

\* cited by examiner

*Primary Examiner* — Michael Cleveland
*Assistant Examiner* — Xiao Zhao
(74) *Attorney, Agent, or Firm* — Ingrassia Fisher & Lorenz, P.C.

(57) ABSTRACT

Components, turbochargers, and methods of forming components are provided. In an embodiment, by way of example only, a method of forming a component is provided. The method includes applying a plurality of coated particles to a substrate, wherein each coated particle comprises a solid film lubricant particle and a layer surrounding an entire surface of the solid film lubricant particle, each solid film lubricant particle comprises at least one compound, and the layer comprises a coating material having a greater resistance to oxidation than the compound when subjected to a predetermined processing temperature and heating the substrate to the predetermined processing temperature to form a portion of a coating over the substrate.

19 Claims, 3 Drawing Sheets

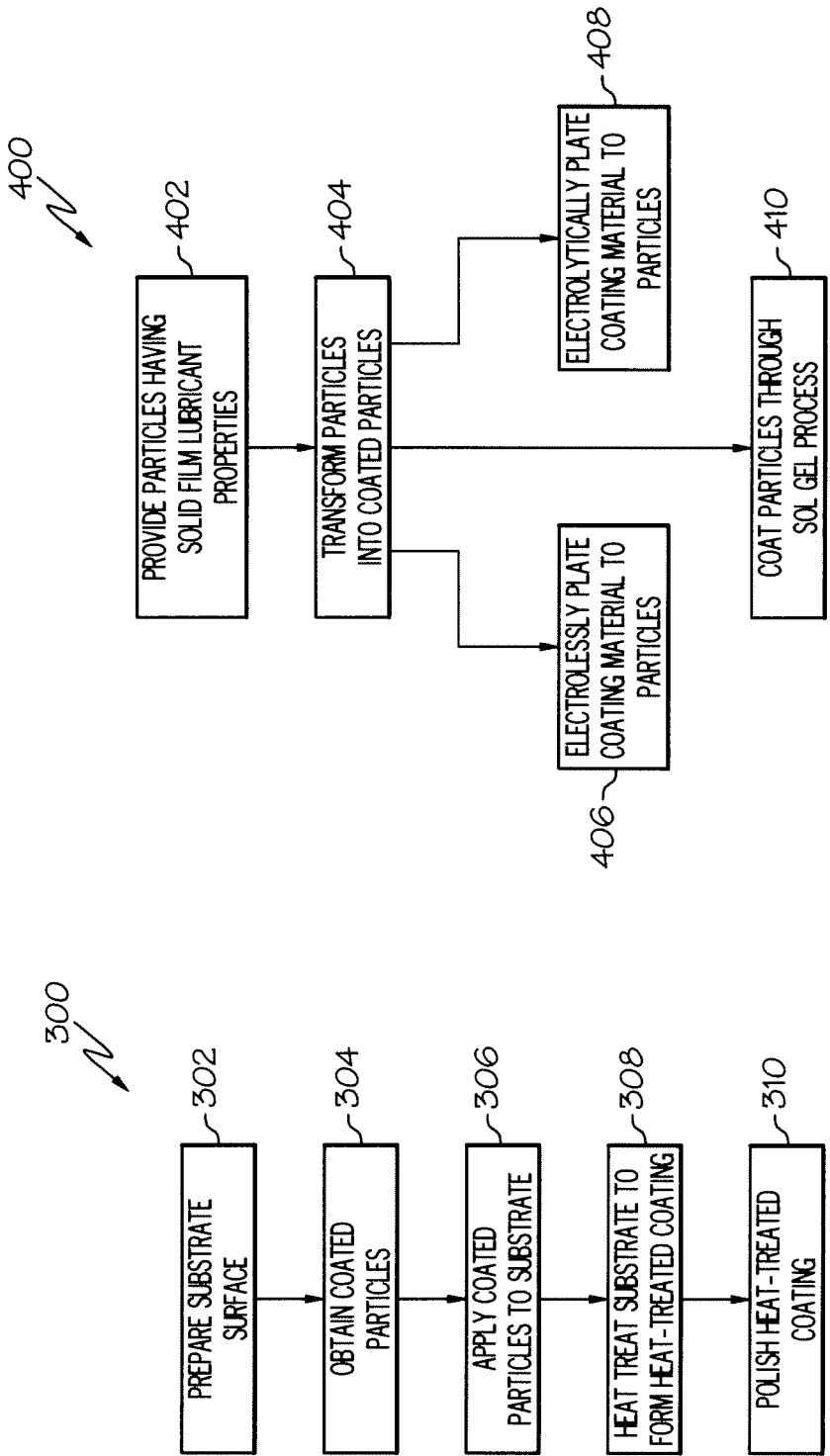

COMPONENTS, TURBOCHARGERS, AND METHODS OF FORMING THE COMPONENTS

CROSS-REFERENCE TO RELATED APPLICATIONS

This application is a divisional of application Ser. No. 12/182,857, now U.S. Pat. No. 8,137,747, filed Jul. 30, 2008.

TECHNICAL FIELD

The inventive subject matter generally relates to turbochargers, and more particularly relates to coatings and coated components for use in turbochargers.

BACKGROUND

Turbochargers are generally used to enhance operability of a device. For example, in the context of turbine engines, turbochargers may be used to heat a volumetric flow of engine exhaust gas to pressurize or boost an intake air stream into a combustion chamber. In this regard, exhaust gas from the engine may be routed into a turbocharger turbine housing within which a turbine is mounted. The exhaust gas flow impinges against the turbine to cause it to spin. Because the turbine is mounted on one end of a shaft that has a radial air compressor mounted on an opposite end, rotary action of the turbine also causes the air compressor to spin. The spinning action of the air compressor causes intake air to enter a compressor housing and to be pressurized or boosted before the intake air is mixed with fuel and combusted within an engine combustion chamber.

To reduce friction between and to extend the useful lives of the rotating components of the turbocharger, foil bearings may be used to support rotating components of the turbine engines, turbochargers, and the like. Generally, a foil bearing includes a journal mounted to the rotating component and a cylindrical top foil disposed around the journal. The journal and top foil are configured such that when the rotating component rotates at an optimum operational speed, the foil and the journal separate from each other to form an air gap. As the air gap between the foil and the journal grows, pressurized air is drawn in to serve as a load support and act as a lubricant to the rotating component and surrounding static components.

In the absence of the pressurized air between the journal and the top foil, the two components may come into contact with each other or with other surrounding components. Thus, to protect the components from premature wear, one or more of the components may include a solid lubricant coating thereon. Some known solid lubricants include graphite fluoride/polymer composites and molybdenum disulfide. However, these materials may not be particularly useful for high temperature machinery since they are only stable at temperatures below about 250° C. Other known solid lubricants include silver, calcium fluoride, and barium fluoride, but these materials may not perform adequately in some circumstances because they may have relatively high porosity and may be relatively difficult to coat. Ternary carbide and nitride materials have also been used as solid lubricants. However, the application process may at least partially decompose the materials, and as a result, the properties of the material may not be fully optimized when used as coatings on components that are exposed to high turbocharger operating temperatures (e.g., temperatures above 535° C.).

Hence, there is a need for methods for manufacturing and/or coating turbocharger components, where the properties of the materials within the resultant coating, such as the low friction coefficient and low wear rate properties of the coating, are optimized when tribocoupled with superalloy materials. Additionally, there is a need for a coating that has improved oxidation-resistance, as compared to conventional coatings. Moreover, it is desirable for the methods of manufacturing the coating to be relatively simple and inexpensive to perform.

BRIEF SUMMARY

Methods, components, and turbochargers are provided.

In an embodiment, by way of example only, a method of forming a component is provided. The method includes applying a plurality of coated particles to a substrate, wherein each coated particle comprises a solid film lubricant particle and a layer surrounding an entire surface of the solid film lubricant particle, each solid film lubricant particle comprises at least one compound, and the layer comprises a coating material having a greater resistance to oxidation than the compound when subjected to a predetermined processing temperature and heating the substrate to the predetermined processing temperature to form a portion of a coating over the substrate.

In another embodiment, by way of example only, a component includes a substrate and a coating over the substrate. The coating includes a plurality of solid film lubricant particles, each solid film lubricant particle comprising at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3, the plurality of solid film lubricant particles including entirely-surrounded solid film lubricant particles and partially-surrounded solid film lubricant particles, each of the entirely-surrounded solid film lubricant particles surrounded by a coating material having a greater resistance to oxidation than the at least one compound when subjected to a predetermined processing temperature, and a surface of the coating includes a plurality of the partially-surrounded solid film lubricant particles.

In still another embodiment, by way of example only, a turbocharger is provided that includes a shaft and a foil bearing disposed around the shaft. The foil bearing includes a substrate and a coating over the substrate, the coating including a plurality of solid film lubricant particles, each solid film lubricant particle comprising at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3, the plurality of solid film lubricant particles including entirely-surrounded solid film lubricant particles and partially-surrounded solid film lubricant particles, each of the entirely-surrounded solid film lubricant particles surrounded by a coating material having a greater resistance to oxidation than the at least one compound when subjected to a predetermined processing temperature, and a surface of the coating includes a plurality of the partially-surrounded solid film lubricant particles.

BRIEF DESCRIPTION OF THE DRAWINGS

The inventive subject matter will hereinafter be described in conjunction with the following drawing figures, wherein like numerals denote like elements, and:

FIG. 3 is a flow diagram of a method for manufacturing a component of the turbocharger, according to an embodiment; and FIG. 4 is a flow diagram of a method of processing a material for use in the method of FIG. 3 for manufacturing the component, according to an embodiment.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
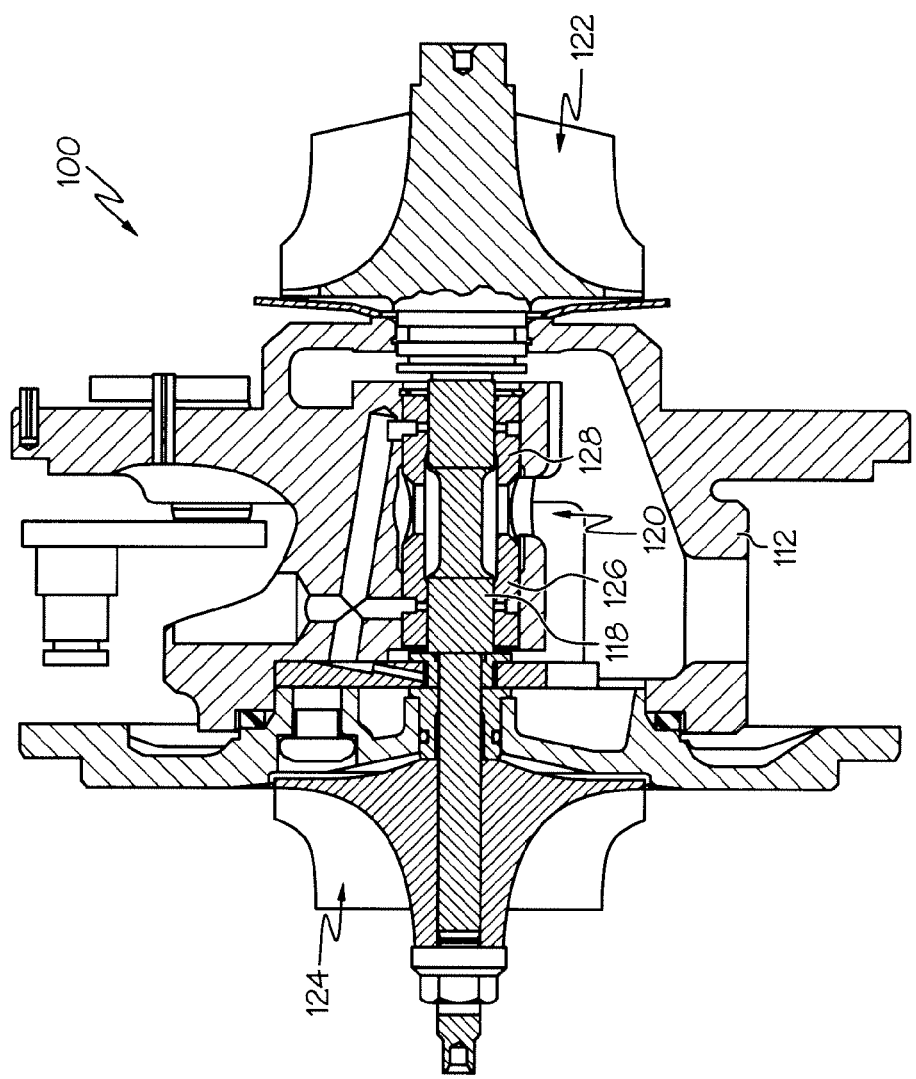
FIG. 1 is a cross-sectional side view of a turbocharger, according to an embodiment.

FIG. 1 is a cross-sectional side view of a turbocharger 100, according to an embodiment. The turbocharger 100 generally includes a housing 112 within which a shaft 118 is rotatably disposed. A turbine or turbine wheel 122 is attached to one end of the shaft 118, and a compressor impeller 124 is attached to an opposite end of the shaft 118. To reduce wear between the shaft 118 and surrounding component, a bearing assembly 120 surrounds the shaft 118. In an embodiment, the bearing assembly 120 includes two bearings 126, 128, one or both of which are made up of foil bearings. In other embodiments, the bearings 126, 128 may include or may be made up of different bearings. Although two bearings 126, 128 are shown, fewer or more bearings may be included.

Figure 2:
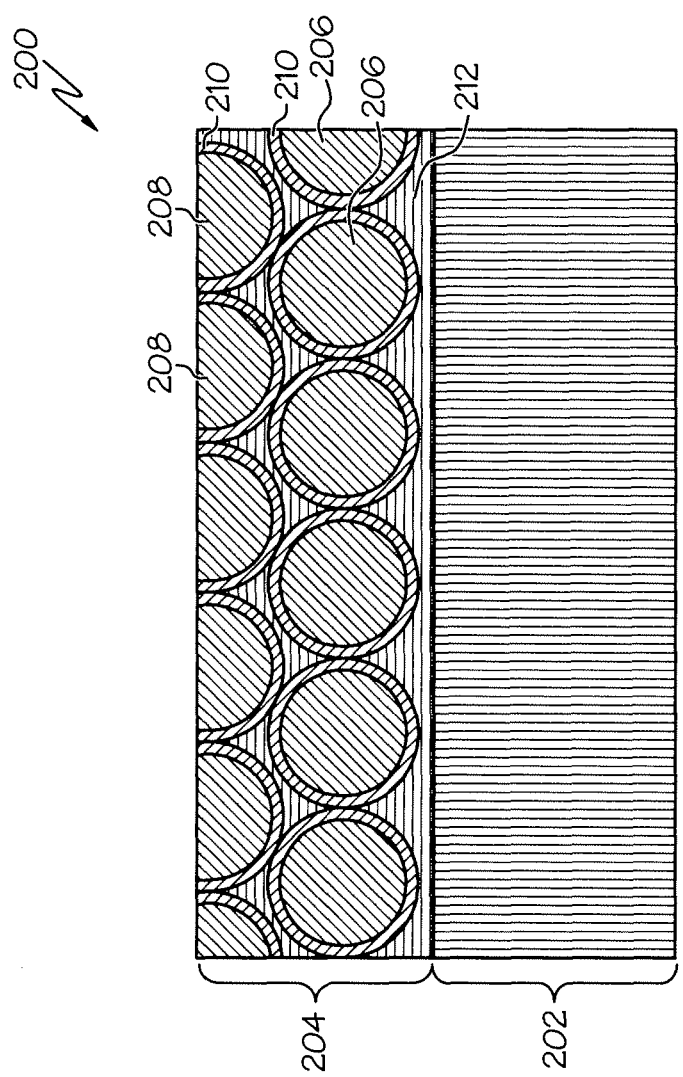
FIG. 2 is a cross-sectional view of a portion of a component that may be used in the turbocharger of FIG. 1, according to an embodiment.

One or more of the turbocharger components maybe made from or coated with one or more solid lubricant materials. FIG. 2 is a cross-sectional view of a portion of a component 200 that may be used in the turbocharger of FIG. 1, according to an embodiment. In an embodiment, the component 200 may be a bearing, such as a foil bearing, journal bearing, roller bearing, and the like. In another embodiment, the component 200 may be a rotating or a stationary turbine blade, airfoil, impeller, shroud, housing, strut, or other component that may be subjected to relatively high temperatures, such as those in excess of 350° C. In any case, the component 200 may be made up of a substrate 202 having a coating 204 thereon. The substrate 202 may be made of a metal, such as a nickel-based alloy, cobalt-based alloy, and the like, or other materials typically used for machine components. Although the portion of the substrate 202 of FIG. 2 is shown to have a rectangular cross section, substrates may have different geometrical cross-sectional shapes, in other embodiments.

The coating 204 is disposed over the substrate 202. Although the coating 204 is shown as being disposed directly on the substrate 202, one or more intervening layers (not shown) may be included in other embodiments. The coating 204 may have a thickness in a range of between about 0.0001 cm to about 0.01 cm, in an embodiment. In other embodiments, the coating 204 may be thicker or thinner than the aforementioned range.

The coating 204 has a formulation that may include one or more constituents. In an embodiment, the constituents may include one or more inorganic materials. The inorganic materials may be selected for certain desired properties. For example, in accordance with an embodiment, the inorganic material may be capable of providing solid film lubricant properties to the coating 204. Suitable materials possessing such properties include those having the chemical formula $M_{n+1}AX_n$ (hereinafter referred to as "MAX materials"), wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3. Examples of MAX materials include, but are not limited to aluminum-based compounds selected from the group consisting of $Cr_2AlC$, $V_2AlC$, $Ti_2AlC$, $Ti_3AlC_2$, $Ti_4AlN_3$, $Ta_2AlC$, $Ta_4AlC_3$, and $Ti_2AlN$. Another example of suitable materials capable of providing solid film lubricant properties include, but are not limited to, one or more metal sulfides, metal fluorides, and/or precious metals. In an embodiment, suitable metal sulfides include, but are not limited to $MoS_2$. In another embodiment, suitable metal fluorides include, but are not limited to fluorides of at least one metal selected from the group consisting of a Group IA alkali earth metal, a Group IIA alkaline earth metal, rare earth metal, and mixtures thereof. In other embodiments, suitable precious metals exhibiting solid film lubricant properties may include, but are not limited to silver, gold, platinum, palladium, rhenium, copper, and mixtures thereof.

In another embodiment, the inorganic material may be selected for an ability to serve as a bonding component for the solid film lubricant. In an example, a suitable inorganic material may be a mixture selected for an ability to melt at a lower temperature than a temperature at which individual components of the mixture may melt. In this regard, the inorganic material may be an inorganic eutectic mixture. Suitable inorganic eutectic mixtures include, but are not limited to silver sulfide/copper sulfide, silver sulfide/lead sulfide, silver sulfide/bismuth sulfide, nickel oxide/vanadium pentoxide, and calcium fluoride/magnesium fluoride. In another example, the inorganic material may be a bonded metal alloy suitable for acting as the bonding component. Suitable bonded metal alloys include, but are not limited to a metal bonded chromium oxide ($Cr_2O_3$), where the bonding metal may be an alloy containing chromium and at least one of nickel, cobalt or mixtures thereof.

In still another embodiment, the inorganic material may be selected for having an ability to provide wear-resistance properties to the solid film lubricant. In such case, the inorganic material may be a metal oxide, such as chromic oxide, nickel oxide, aluminum oxide, boron oxide or another metal oxide.

In yet another embodiment, the formulation of the coating 204 may include a non-metallic component. Suitable non-metallic components include, but are not limited to ceramics, silicates, and/or binders. Suitable examples of ceramics include, but are not limited to $Cr_2O_3$, $Al_2O_3$, and $TiO_2$. Suitable examples of silicates include, but are not limited to sodium silicate. The binder may be an organic or inorganic binder. For example, suitable organic binders include, but are not limited to organic polymer binders, such as ethyl cellulose and nitrocellulose. Inorganic binders that may be incorporated include, but are not limited to fluoride glasses.

As mentioned above, the coating 204 includes one or more constituents having solid film lubricant properties. In order to optimize these properties, the solid film lubricant constituents may be deposited onto the substrate 202 as particles (referred to hereinafter as "solid film lubricant particles") that are entirely surrounded by a coating material 210 or partially surrounded by the coating material 210. Thus, as shown in FIG. 2, the coating 204 may be made up of a plurality of solid film lubricant particles that include entirely-surrounded solid film lubricant particles 206 and partially-surrounded solid film lubricant particles 208. In an embodiment, a majority (e.g., greater than 50%) of the solid film lubricant particles 206, 208 comprises MAX materials. In another embodiment, substantially all (e.g. greater than 99%) of the solid film lubricant particles 206, 208 comprise MAX materials. The coating material 210 may be selected for having a greater resistance to oxidation than the compound, when subjected to predetermined processing temperatures, which may vary from process to process. For example, in one embodiment, the predetermined processing temperature may be a temperature that is greater than the temperature at which the solid film lubricant constituents may oxidize. In another embodiment, the predetermined processing temperature may be equal to or greater than about 980° C.

Several materials may suitably act as the coating material 210. In an embodiment, the coating material 210 may include a suitable metal, such as nickel, gold, silver, platinum, palladium, and/or a precious metal. In other embodiments, the coating material may include an inorganic material, a ceramic, and a glass or silicate. Examples of suitable inorganic materials include, but are not limited to silicon dioxide ($SiO_2$), aluminum oxide ($Al_2O_3$), and zirconium oxide ($ZrO_2$). Suitable ceramics may include, but are not limited to silicon dioxide ($SiO_2$), aluminum oxide ($Al_2O_3$), and zirconium oxide ($ZrO_2$). Suitable glasses include, but are not limited to silicates and borates. In still other embodiments, the coating material 210 may or may not include one or more of the materials noted above as coating 204 formulation constituents. In any event, the coating material 210 may make up less than about 5% of the coating 204.

As shown in FIG. 2, the coating 204 may include a matrix 212 within which the entirely-surrounded solid film lubricant particles 206 and partially-surrounded solid film lubricant particles 208 are embedded. The matrix 212 may include one or more of the constituents mentioned above as being included in the coating 204 formulation, including other constituents having solid film lubricant properties, in an embodiment. In another embodiment, the matrix 212 may include the coating material 210.

To form the coating 204 over the substrate 202, a method 300 depicted in FIG. 3 may be employed. In an embodiment, the method 300 includes preparing a surface of a substrate to be coated, step 302. In an example, surface preparation may include a chemical process. For example, the substrate surface may be chemically etched to provide a micro-roughened surface adapted for bonding coated particles thereto. In an embodiment, the substrate surface may be chemically etched by applying a chemical etchant thereto. Suitable chemical etchants include, but are not limited to, a solution of ferric chloride (e.g., 40 weight % ferric chloride in water) and a dilute mineral acid. In another example, surface preparation may include oxidizing the substrate surface to form an oxide film thereon. In an embodiment, the substrate surface may be oxidized by exposure to heat in the presence of air. For example, the substrate and the air may be heated to a temperature in a range of between about 500° C. to about 1000° C. or any other temperature suitable for promoting oxidation. In still another example, the substrate surface may be cleaned. In one embodiment, the substrate surface is rinsed with deionized water to remove any traces of chemical etchant, if used, or to remove dust or other unwanted particles.

Before, after, or substantially simultaneously with step 302, a plurality of coated particles is obtained, step 304. In an embodiment, the coated particles may be formed. FIG. 4 is a flow diagram of a method 400 of forming the coated particles, according to an embodiment. First, solid film lubricant particles having desired solid film lubricant properties are provided, step 402. In one embodiment, the solid film lubricant particles may comprise MAX materials. For example, the MAX materials may be obtained off-the-shelf as powders. In other examples, the MAX materials are manufactured by combining and mixing powders to form a substantially homogenous mixture. In an embodiment, powders of each element in the MAX material are obtained. For example, in an embodiment in which the MAX material comprises $Cr_2AlC$, elemental chromium powder, elemental aluminum powder, and elemental carbon powder are obtained. In an embodiment, the powders may be prepared by milling, pulverizing, or otherwise transformed into particles having diameters in a range of from about 1 nm to about 25 μm. In other embodiments, the diameter may be larger or smaller.

Next, the powders are combined in appropriate stoichiometric proportions. For example, when preparing $Cr_2AlC$, which is a 2-1-1 compound, molar equivalents (1×) of aluminum and carbon are combined with two molar equivalents (2×) of chromium. The powders can be uniformly combined by ball milling or by using other suitable mixing procedures. In embodiments in which the particles having solid film lubricant properties comprise other materials, the aforementioned formulation process may be performed, or another suitable formulation process may alternatively be performed. For example, although the description below refers to the use of MAX materials for use as the solid film lubricant particles, other inorganic material may additionally or alternatively be used, as discussed previously.

The solid film lubricant particles are then transformed into a plurality of coated particles, step 404. For example, a layer may be formed around an entirety of the surface of each solid film lubricant particle, where the layer comprises a coating material having a greater resistance to oxidation than the MAX material when subjected to temperatures greater than a predetermined processing temperature. In an embodiment, the predetermined processing temperature may be about 980° C. In other embodiments, the predetermined processing temperature may be less than or greater than 980° C. In any case, the layer may serve as a protective coating for the particle so that the MAX material may be used in processes in which exposure to predetermined processing temperatures occur.

As noted above, several of the coating materials may suitably comprise the layer; and thus, the particular process by which the layer is formed may vary. In an embodiment in which the coating material comprises a metal, such as nickel, gold, silver, platinum, palladium, and/or another precious metal, the coating material may be electrolessly plated to each solid film lubricant particle, step 406. In particular, the MAX material may be disposed in a bath comprising electrolytic or electroless plating solutions such as electroless nickel-phosphorus solutions (e.g., MacDermid Niklad 724 available through MacDermid, Incorporated of Denver, Colo.) and electroless nickel-boron solutions (e.g., MacDermid Niklad 752 available through MacDermid, Incorporated of Denver, Colo.) or precursors for silicon dioxide ($SiO_2$), Aluminum oxide ($Al_2O_3$), and/or zirconium oxide ($ZrO_2$) solgel coatings and one or more solutions, at least one of which includes the coating material, may be mixed into the bath. As a result, the coating material may adhere to the surfaces of each solid film lubricant particle. In another embodiment, the coating material may be electrolytically plated to the solid film lubricant particles, step 408. In such case, the MAX material may be placed in an electrolytic bath into which the coating material may be mixed. After a current is passed through the bath, the coating material adheres to the surfaces of each solid film lubricant particle.

In still another embodiment in which the coating material is selected from a ceramic or a silica, the MAX material may be coated with the coating material through a solgel process, step 410. In accordance with an embodiment of the sol-gel process, the coating material in liquid phase may be obtained.

The MAX material then may be mixed into the liquid to form a colloid, in an embodiment. In another embodiment, the MAX material may be dispersed within the liquid to form a suspension. Next, the colloid or suspension may be dried or thermally treated resulting in the plurality of coated particles.

As a result of the coating processes mentioned above, substantially all (e.g., at least about 99%) of the solid film lubricant particles are coated with a layer of the coating material. In an embodiment, each layer has a thickness in a range of from between about 0.05 micron to about 5.0 microns. In accordance with other embodiments, the layers may be thicker or thinner.

Returning to FIG. 3, the plurality of coated particles may be applied to the substrate, step 306. In an embodiment, the plurality of coated particles may be mixed with additional constituents to form a coating powder mixture. For example, the additional constituents may be one or more of the constituents mentioned above with regard to the formulation of coating 204 (FIG. 2). In another embodiment, the plurality of coated particles may be mixed with a liquid to form a paste. The liquid may be deionized water, alcohol, or other suitable solvent. In any case, the paste may have a viscosity in a range of from about 50,000 to 300,000 Centipoise, in an embodiment. In another embodiment, the viscosity of the paste may be in a range from about 100,000 to 300,000 Centipoise, but may, in other embodiments, be in a range of from about 100,000 to 250,000 Centipoise. In yet another embodiment, a binder may be added to the paste. For example, suitable binders include organic binders such as ethylcellulose, nitrocellulose, and acrylic.

The paste may then be applied to the substrate. In an example, the paste may be applied to the substrate by a thick film screen printing process. In an embodiment, a mesh screen is placed over a portion of the substrate to be coated, and the paste is pressed through the mesh onto the substrate. Any marks remaining on the substrate from the mesh may be removed by a subsequent polishing process. In another embodiment, the paste may be formed into a tape and the tape may be transferred to the substrate. In other embodiments, alternate application processes may be employed. For example, the paste may be painted or brushed onto the substrate, or the paste may be sprayed, printed, cast or doctor-bladed onto the substrate.

After the paste is disposed over the substrate, it may be air dried, in an embodiment. In another embodiment, the paste may be dried by heating to a first temperature sufficient to remove substantially all liquid therefrom. In an embodiment, the first temperature may be in a range of from about 85° C. to 150° C. In another embodiment, the first temperature may be in a range of from about 95° C. to 150° C. In still another embodiment, the first temperature may be in a range of from about 100° C. to 150° C. The first temperature may be maintained for a time period in a range of from about 5 minutes to 60 minutes, in an embodiment.

The substrate may be subjected to a heat treatment, step 308 in order to form a heat-treated coating. In an embodiment, the heat treatment may occur at a second temperature to impart desired properties into the resultant coating. For instance, the second temperature may be greater than the first temperature and may be sufficient to melt the constituents in the paste without melting the substrate. In an example, the second temperature may be in a range of from about 600° C. to 1200° C. At these temperatures, in embodiments in which the coating material around the coated particles comprise silica and/or ceramics, the coating material may melt or at least partially soften to serve as a binder between the particles and/or constituents in the coating formulation. As a result, a surface of the heat-treated coating may include a plurality of particles, the majority of which are either coated particles or are entirely surrounded by coating material.

To enhance the solid film lubricant properties of the heat-treated coating, polishing may be performed to form a finished component, step 310. In an embodiment, a surface of the heat-treated coating is polished to remove at least a portion of the coating material from the coated particles located at the surface. Consequently, at least a portion of the solid film lubricant particles may be exposed to thereby exhibit solid film lubrication properties during component usage. Polishing may be performed using abrasive pastes, papers, and/or pads, in an embodiment. The coated substrate may be further processed in a finished component and/or implemented into another larger component and/or may be implemented into an engine, turbocharger, or the like, for use. For example, in the case of a foil bearing, the coated substrate may be formed into a suitably shaped cylinder and implemented onto an engine shaft.

By processing the coated substrate using the aforementioned method, solid film lubricants that may have oxidized at certain processing temperatures can now be used in processes that employ higher processing temperatures. In particular, by coating the solid film lubricant particles with a coating material capable of withstanding oxidation at the higher processing temperatures, the solid film lubricant particles may be protected from oxidation during processing. Additionally, subsequent polishing of the coating material from the solid film lubricant particles after the particles have been applied to a substrate enhances the solid film lubricant properties of the particles.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A component comprising:
   a substrate; and
   a coating over the substrate, the coating including a plurality of solid film lubricant particles, each solid film lubricant particle comprising at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3, the plurality of solid film lubricant particles including entirely-surrounded solid film lubricant particles and partially-surrounded solid film lubricant particles, each of the entirely-surrounded solid film lubricant particles surrounded by a coating material having a greater resistance to oxidation than the at least one compound when subjected to a predetermined processing temperature;

wherein the coating further comprises a polished contact surface produced pursuant to a controlled polishing process and along which the partially-surrounded solid film lubricant particles are disposed, and wherein the partially-surrounded solid film lubricant particles each comprise an entirely-surrounded solid film lubricant particle from which a portion of the coating material has been removed during the controlled polishing process to expose the partially-surrounded solid film lubricant particle through the polished contact surface of the coating and increase the lubricity thereof.

2. The component of claim 1, wherein the coating comprises at least one metal selected from a group consisting of nickel, gold, silver, platinum, and palladium.

3. The component of claim 1, wherein the coating comprises at least one material selected from the group consisting of a ceramic and a silica.

4. The component of claim 1, wherein the compound comprises at least one aluminum-based compound selected from the group consisting of $Cr_2AlC$, $V_2AlC$, $Ti_2AlC$, $Ti_3AlC_2$, $Ti_4AlN_3$, $Ta_2AlC$, $Ta_4AlC_3$, and $Ti_2AlN$.

5. A turbocharger comprising:
a shaft; and
a foil bearing disposed around the shaft, the foil bearing including:
   a substrate; and
   a coating over the substrate, the coating including a plurality of solid film lubricant particles, each solid film lubricant particle comprising at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3, the plurality of solid film lubricant particles including entirely-surrounded solid film lubricant particles and partially-surrounded solid film lubricant particles, each of the entirely-surrounded solid film lubricant particles surrounded by a coating material having a greater resistance to oxidation than the at least one compound when subjected to a predetermined processing temperature;
wherein the coating further comprises a polished contact surface produced pursuant to a controlled polishing process and along which the partially-surrounded solid film lubricant particles are disposed, and wherein the partially-surrounded solid film lubricant particles each comprise an entirely-surrounded solid film lubricant particle from which a portion of the coating material has been removed during the controlled polishing process to expose the partially-surrounded solid film lubricant particle through the polished contact surface of the coating and increase the lubricity thereof.

6. The turbocharger of claim 5, wherein the coating comprises at least one metal selected from the group consisting of nickel, gold, silver, platinum, and palladium.

7. The turbocharger of claim 5, wherein the coating comprises a material selected from the group consisting of a ceramic and a silica.

8. The turbocharger of claim 5, wherein the compound comprises at least one aluminum-based compound selected from the group consisting of $Cr_2AlC$, $V_2AlC$, $Ti_2AlC$, $Ti_3AlC_2$, $Ti_4AlN_3$, $Ta_2AlC$, $Ta_4AlC_3$, and $Ti_2AlN$.

9. The turbocharger of claim 5, wherein the substrate comprises a nickel-based superalloy.

10. A component, comprising:
a substrate; and
a low-friction coating formed over the substrate and having a polished contact surface, the low-friction coating comprising:
   a matrix material;
   a particle coating material; and
   a first plurality of solid film lubricant particles embedded in the matrix material, partially surrounded by the particle coating material, and exposed through the polished contact surface of the low-friction coating;
wherein the low-friction coating is formed by heat treatment at a predetermined processing temperature, wherein the particle coating material has a greater resistance to oxidation at the predetermined processing temperature than does the first plurality of solid film lubricant particles, and wherein the polished contact surface is produced by polishing the low-friction coating after heat treatment with at least one of an abrasive paste, paper, or pad to expose the first plurality of solid film lubricant particles through the polished contact surface by partially removing the particle coating material therefrom.

11. A component of claim 10, wherein the low-friction coating further comprises a second plurality of solid film lubricant particles embedded in the matrix material and not exposed through the contact surface of the low-friction coating.

12. The component of claim 11, wherein the particle coating material entirely surrounds the second plurality of solid film lubricant particles.

13. The component of claim 10, wherein the substrate and the low-friction coating are formed into a foil bearing.

14. The component of claim 10, wherein the low-friction coating is disposed directly on the substrate.

15. The component of claim 10, wherein the first plurality of solid film lubricant particles comprises at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3.

16. The component of claim 10, wherein the first plurality of solid film lubricant particles comprises at least one of the group consisting of a metal sulfide, a metal fluoride, and a precious metal.

17. The component of claim 10, wherein the particle coating material comprises at least one of the group consisting of nickel, gold, silver, platinum, and palladium.

18. The component of claim 10, wherein the particle coating material comprises a ceramic.

19. The component of claim 10, wherein the particle coating material comprises a glass.

* * * * *